United States Patent [19]

Matsumoto et al.

[11] Patent Number: 5,754,744
[45] Date of Patent: May 19, 1998

[54] PRINTING CONTROL APPARATUS

[75] Inventors: Kenji Matsumoto, Yamatokoriyama; Toshihiro Okahashi, Kashihara, both of Japan

[73] Assignee: Sharp Kabushiki Kaisha, Osaka, Japan

[21] Appl. No.: 619,172

[22] Filed: Mar. 21, 1996

[30] Foreign Application Priority Data

Mar. 22, 1995 [JP] Japan .................... 7-062556

[51] Int. Cl.⁶ .................... G06K 15/00
[52] U.S. Cl. .................... 395/112; 395/113; 395/114
[58] Field of Search .................... 395/112, 113, 395/114, 115, 101, 105, 109, 111, 116, 117; 358/437, 407, 468, 401, 404, 406, 409, 444, 442; 399/1, 2, 8; 347/5, 111, 224, 171

[56] References Cited

U.S. PATENT DOCUMENTS 5,287,194  2/1994  Lobiondo .................... 395/114

FOREIGN PATENT DOCUMENTS 0468762  1/1992  European Pat. Off. .
3-157716  of 1991  Japan .
4-3220    of 1992  Japan .

*Primary Examiner*—Edward L. Coles, Sr.
*Assistant Examiner*—Dov Popovici
*Attorney, Agent, or Firm*—David G. Conlin; David D. Lowry

[57] ABSTRACT

A printing control apparatus is used as being connected to a printing apparatus. The time required for printing is calculated from the print information to be printed stored in print information memory and the printing speed of the printing apparatus, and the calculated time required for printing is set as the print time zone on the same time axis on which the print start time zone capable of starting print is set, corresponding to the print information. When the print start time and print end time of the print time zone are both within the print time zone, the print information is printed by the printing apparatus when the time measured by the clock and the print start time coincide. If at least one of the print start time and print end time of the print time zone is out of the print time zone, printing of print information is prohibited. Therefore, within the preset print time zone, print information can be printed by reservation, and by setting the print start time zone, for example, in the less busy time zone of the printing apparatus, ordinary function of printing without reservation and reserved print function can be executed efficiently.

8 Claims, 18 Drawing Sheets

SETTING IN PRINTER MODE

WHILE TRANSFERRING DATA FROM HOST

AFTER DATA TRANSFER

WHEN "PRINTOUT RIGHT NOW" IS SELECTED

WHEN "SET RESERVED-PRINT" IS SELECTED

WHEN SETTING OF RESERVED-PRINT IS OVER

PRINTING CONTROL APPARATUS

BACKGROUND OF THE INVENTION

1. Field of the Invention

The present invention relates to a printing control apparatus for controlling printing time in the case of printing by using a printing apparatus such as a printer and a digital copier.

2. Description of the Related Art

Recently, as represented by so-called page printers and digital copiers, various printing apparatuses are widely distributed, and they are used not only as printers, but also connected to plural terminal devices such as computers serving as hosts, and are used as so-called network printers. Since plural terminal devices share one printing apparatus, the data printing condition is controlled, for example, by a reserve printing function.

For example, according to Japanese Unexamined Patent Publication JPA 3-157716 (1991), data given from terminal devices to the printing apparatus are designed to be printed in order differing from order of supply.

More specifically, data received from a terminal device are stored in one of plural buffers. Herein, plural buffers in which received data are stored are changed over at predetermined regular time intervals, and data are stored in a different buffer depending on the data receiving time. In the plural buffers, moreover, a print specified time K1 is preset. When data are transmitted from a terminal device to the printing apparatus, and a desired print specified time K2 is set, in the printing apparatus, the buffer in which the corresponding print specified time K1 is referred to, and the number of data stored in the buffer is judged to be less than a specified number or not. If not less than the specified number, a new desired print specified time K3 is specified by adding a predetermined time k to the desired print specified time K2. When the desired print specified time K3 is set, the buffer in which the print specified time K1 is set is referred to, and the same judgment and process as in the case of the desired print specified time K2 are executed. When the number of data stored in the buffer is less than the specified number, the received data are stored in the last place of the pertinent buffer. Print of the stored data is started when reaching the print specified time K1 specified in the buffer.

Thus, even if the number of data already stored in the printing apparatus is relatively large, it is designed to start printing of data at the time desired by an operator as far as possible.

For example, Japanese Unexamined Patent Publication JPA 4-3220 (1992) discloses a constitution in which not only printing is executed only when an operator of a terminal device issues a print command, or when the data to be printed are received by the terminal device, but also a reserved print function to start printing operation at a preset time can be executed.

Specifically, when the time measured by the clock reaches a preset print start time, data print operation is executed. In this way, it is designed to start data printing at the time desired by the operator. Additionally, it is designed to set also a print information name when the print start time is set.

However, in the prior art disclosed in Japanese Unexamined Patent Publication JPA 3-157716 (1991), printing is not always started at the time desired by an operator. If printing is not started at the operator's desired time, it is also constituted to start printing at a time as close to the desired time as possible, but depending on the number of data stored in each buffer, printing may be started at a far different time.

In the prior at disclosed in Japanese Unexamined Patent Publication JPA 4-3220 (1992), regarding printing of two sets of data, for example, if the preset print start time overlaps, the first data set in the time is printed first, and the next data set in the time is printed later. Comparing the two sets of data, priority of start of printing is not always given to the first data set in the time rather than the next data set in the time, and if the priority is given to the next data set in the time, the desired data may not be printed at the desired time.

As in the case of Japanese Unexamined Patent Publication JPA 4-3220 (1992), when a reserved print function is added, generally, this function is set to have priority over the ordinary printing function not printing by reservation, and therefore the reserved print function is used very frequently, and if there are many settings of the reserved print starting time or the quantity of data to be printed is large, it is impossible to print by making use of the ordinary printing function.

Moreover, in both prior arts disclosed in Japanese Unexamined Patent Publications JPA 3-157716 (1992) and JPA 4-3220 (1992), printing cannot be terminated at the print end time desired by the operator. The print start time may be anytime, and if the quantity of data to be printed is very large or the distance between the printing apparatus and terminal device is very remote, it may be desired to specify the print end time. When printing is terminated at the specified time, it is not necessary to go to the place of the printing apparatus to check if printing is finished or not, and convenience for the operator is remarkably improved.

SUMMARY OF THE INVENTION

It is hence an object of the invention to provide a printing control apparatus capable of executing smoothly a reserved print function for reserving printing time.

To achieve the object, the invention provides a printing control apparatus to be used in connection with a printing apparatus comprising:

print information memory means for storing print information to be printed;

clock means for measuring time;

print start time zone setting means for setting a print start time zone possible to start printing;

operation means for calculating the time required for printing from the quantity of the print information stored in the print information memory means and printing speed of printing apparatus;

print time zone setting means for setting the calculated time required for printing as a print time zone on a time axis in which the print start time zone is set, corresponding to the print information stored in the print information memory means;

start time judging means for judging whether the print start time of the print time zone is within the print start time zone;

end time judging means for judging whether print end time of the print time zone is within the print start time zone; and control means for printing the print information stored in the print information memory means by the printing apparatus when the time measured by the clock means coincides with the print start time, in the case where the judging results of the start time judging means and end time judging means indicate that the print start time and print end time of the print time zone are both within the print start time zone, or prohibiting printing of the print information when at least one of the print start time and print end time of the print time zone is out of the print start time zone.

According to the invention, the printing control apparatus is used as being connected to a printing apparatus. From the print information to be printed that is stored in the print information memory means and the printing speed of the printing apparatus, the time required for printing is calculated, and the calculated time required for printing is set as the print time zone on the same time axis as the print start time zone capable of starting printing, corresponding to the print information. In the case where the print start time and print end time of the print time zone are both within the print start time zone, when the time measured by the clock means coincides with the print start time, printing the print information is started in the printing apparatus. When at least one of the print start time and print end time of the print time zone is out of the print start time zone, printing the print information is prohibited.

Therefore, print information can be printed by reserving within the determined print start time zone, and by setting the print start time zone, for example, in a relatively idle time zone of the printing apparatus, both ordinary function of printing without reservation and function of printing by reservation can be executed efficiently. Hence, it decreases the inconvenience of incapability of printing by using either function due to overlapped use of ordinary function and reserve function, and the convenience of the printing apparatus is enhanced remarkably. More specifically, when the printing apparatus is used as a printer or a copier for printing and issuing print information, the print start time zone can be set in a time zone of low frequency of use as a copier, and hence overlapping of applications as printer and copier may be avoided as far as possible.

The invention further provides a printing control apparatus to be used in connection with a printing apparatus comprising:

print information memory means for storing print information to be printed;

clock means for measuring time;

operating means for calculating the time required for printing from the quantity of print information stored in the print information memory means and printing speed of printing apparatus;

print time zone setting means for setting the calculated time required for printing as a print time zone, corresponding to the print information stored in the print information memory means; and control means for printing the print information stored in the print information memory means by the printing apparatus when the time measured by the clock means coincides with the print start time of the print time zone.

According to the invention, the printing control apparatus is used as being connected to the printing apparatus. The time required for printing is calculated from the print information to be printed stored in the print information memory means and the printing speed of the printing apparatus, and the calculated time required for printing is set as a print time zone, corresponding to the print information. When the time measured by the clock means and the print start time coincide, the print information is printed by the printing apparatus.

Therefore, if the print start time zone is not set, the time required for printing is calculated from the print information quantity and the printing speed, and the print time zone is set, so that the print information can be printed in an appropriate time zone, not overlapping with the print time zone of other reserved print information.

The printing control apparatus of the invention further comprises print forbidden time zone setting means for setting a print forbidden time zone for forbidding printing;

wherein the control means prohibits printing of print information when the print time zone is within the print forbidden time zone.

According to the invention, while the print time zone is within the print forbidden time zone, printing of print information is prohibited, and reserved print can be avoided in this print forbidden time zone. By setting the print forbidden time zone in the relatively busy time zone of the printing apparatus, the ordinary function of printing without reservation and the function of printing by reservation can be executed efficiently. Accordingly, it decreases the inconvenience of incapability of printing by using either function due to overlapped use of ordinary function and reserve function, and the convenience of the printing apparatus is enhanced remarkably. More specifically, when the printing apparatus is used as a printer or a copier for printing and issuing print information, the print forbidden time zone can be set in a relatively busy time zone of use as a copier, and hence overlapping of applications as printer and copier may be avoided as far as possible.

The printing control apparatus of the invention also comprises warning means for warning that printing is not allowed, wherein when the print time zone is within the print forbidden time zone and printing of print information is prohibited, the control means causes the warning means to warn that printing is not allowed.

According to the invention, when the print time zone is within the print forbidden time zone and printing of print information is prohibited, the warning means warns that printing is not allowed. Therefore, the operator securely knows that printing is not allowed. More specifically, it may be noticed by displaying in the display means of the printing apparatus, or by installing noticing means.

Moreover, the printing control apparatus of the invention comprises priority order setting means for setting priority order of printing corresponding to the print information, wherein the control means prints the print information in the printing apparatus according to the priority order set in the priority order setting means when the print time zones calculated and set in plural sets of printing information are overlapped.

According to the invention, when the print time zones calculated and set in plural sets of print information are overlapped, the print information is printed according to the preset priority order. Therefore, if there are plural sets of print information overlapped in the print time zone, they are printed according to the present priority order, so that the print information can be printed in the appropriate order within a desired time zone.

The printing control apparatus of the invention also comprises output means for outputting the print time zone information including the print start time and print end time of the print information stored in the print information memory means.

According to the invention, the print time zone information including the print start time and print end time of the print information are outputted. Therefore, the operator easily knows the present reservation situation, and the ease of operation of setting of reserved print is notably improved.

The printing control apparatus of the invention moreover comprises comparing means for comparing the quantity of print information and the memory remainder of the print information memory means, wherein the control means prohibits printing of the print information when the result of comparison by the comparing means shows that the quantity of printing information is over the memory remainder of the print information memory means.

According to the invention, when the quantity of print information is over the memory remainder of the print information memory means, printing of the print information is prohibited. Therefore, the print information over the memory capacity of the print information memory means is not printed, and reserved print depending on the memory capacity can be set, so that the controllability may be enhanced.

The printing control apparatus of the invention further comprises desired print end time setting means for setting desired print end time for finishing printing, and warning means for warning printing is not allowed, wherein the print time zone setting means sets the print time zone so that the desired print end time may coincide with the print end time in the print tine zone, and the control means prohibits printing of the print information when the print start time of the print time zone set by the print time zone setting means is past the time measured by the clock means, while the warning means warns printing is not allowed.

According to the invention, when the print start time of the print time zone set by the print time zone setting means is past the time measured by the clock means, printing of the print information is prohibited, while the warning means warns that printing is not allowed. Therefore, printing is over at the print end desired time, and if it is impossible, the impossibility is noticed to the operator.

The printing control apparatus of the invention further comprises desired print end time setting means for setting desired print end time for finishing printing, wherein the print time zone setting means sets the print time zone so that the desired print end time may coincide with the print end time in the print tine zone, and the control means shifts the print time zone so that the print start time may be later than the time measured by the clock means when the print start time of the print time zone set by the print time zone setting means is past the time measured by the clock means.

According to the invention, when the print start time of the print time zone set by the print time zone setting means is past the time measured by the clock means, the print time zone is shifted so that the print start time may be later than the time measured by the clock means. As a result, printing can be finished at the print end desired time as far as possible, and if not possible, printing can be finished at a time near the print end desired time.

BRIEF DESCRIPTION OF THE DRAWINGS

Other and further objects, features, and advantages of the invention will be more explicit from the following detailed description taken with reference to the drawings wherein.

DETAILED DESCRIPTION OF THE PREFERRED EMBODIMENTS

Figure 1:
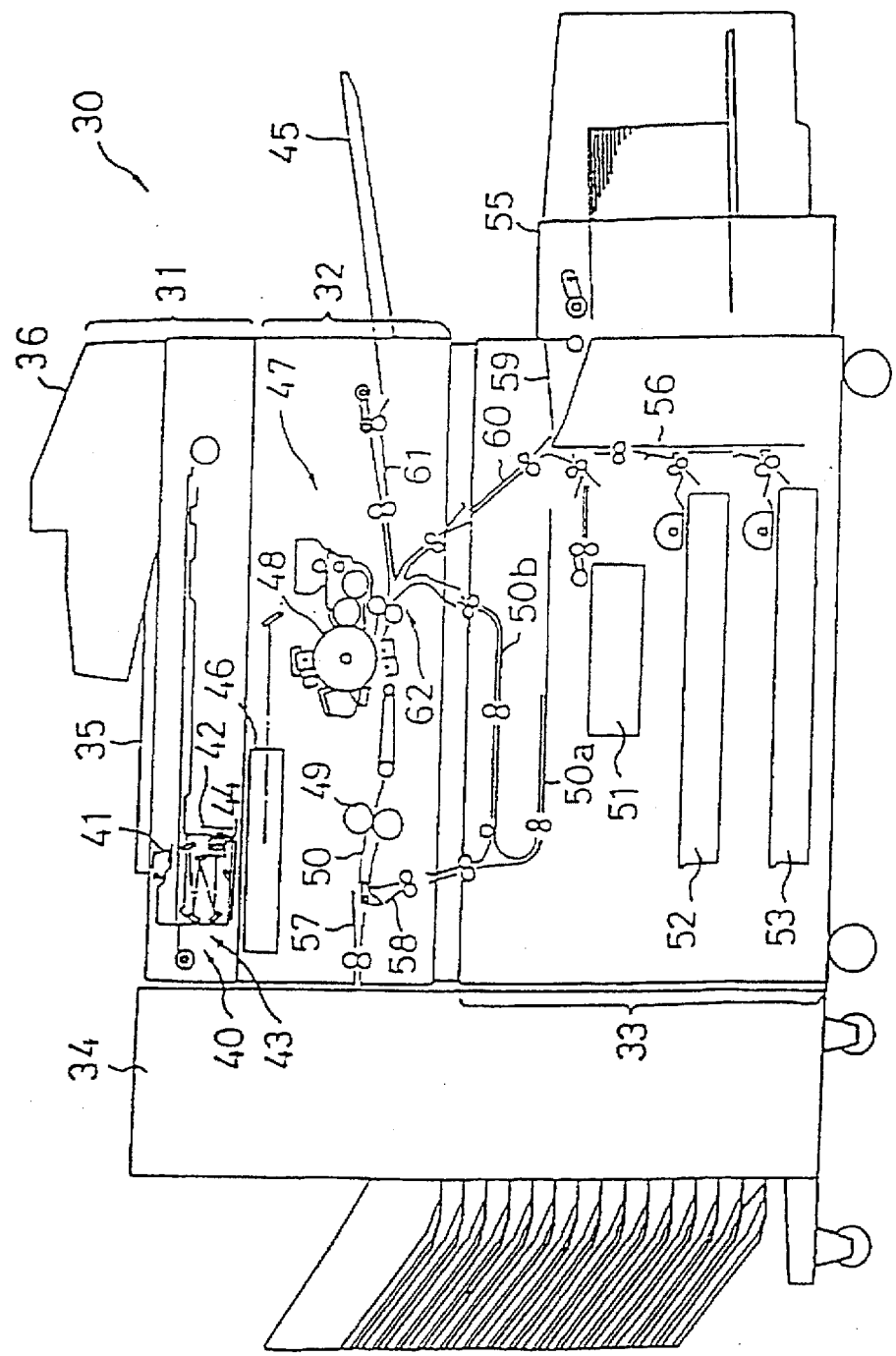
FIG. 1 is a sectional view showing a general structure of a digital copier 30 of the invention by cutting off its outer frame.

Now referring to the drawings, preferred embodiments of the invention are described below.

(Embodiment 1)

Referring now to FIGS. 1 to 9F, embodiment 1 of the invention is described in detail below. Incidentally, the description of FIGS. 1 to 4 is applied to all of embodiments 2 to 10 mentioned later.

FIG. 1 is a sectional view showing a general structure of a digital copier 30, by cutting off its outer frame, as an embodiment of a printing apparatus comprising a printing control apparatus according to the invention.

As shown in the diagram, the digital copier 30 of the invention comprises a scanner 31, a laser printer 32, a multi-stage paper feed unit 33, and a sorter 34. The scanner 31 is composed of an original platen 35 made of transparent glass, a reciprocating document feeder (RDF) 36, and a scanner unit 40.

The multi-stage paper feed unit 33 possesses a first cassette 51, a second cassette 52, a third cassette 53, and a fourth cassette 55 which can be added by selection. In the multi-stage paper feed unit 33, the recording paper is fed out one by one from the top of the block of recording papers stored in the cassette of each stage, and is conveyed toward the laser printer 32.

The RDF 36 sets a plurality of documents at once, and feeds the document one by one automatically into the scanner unit 40, and one or both sides of the document are read by the scanner unit 40 depending on the selection by the operator.

The scanner unit 40 is composed of a lamp reflector assembly 41 for exposing the document, plural reflection mirrors 43 for leading the reflected ray of light from the document into a charge coupled device (CCD) 42, and a lens 44 for focusing the reflected ray of light from the document on the CCD 42. The scanner 31 is designed, when scanning the document put on the original platen 35, so that the scanner unit 40 may read the document image while moving along the lower side of the original platen 35, and when using the RDF 36, it is designed to read the document image while conveying the document in the state of stopping the scanner unit 40 at a specified position beneath the RDF 36.

The image data obtained by reading the document image by the scanner 40 are sent into an image processing unit, not shown, to undergo various processes, and is once stored in the memory of the image processing unit, and depending on an output instruction, the image data in the memory are given to the laser printer 32, and an image is formed on the recording paper. The laser printer 32 comprises a hand set original tray 45, a laser writing unit 46, and an electrophotographic process unit 47 for forming an image.

The laser writing unit 46 comprises a semiconductor laser for emitting a laser beam depending on the image data from the memory, a polygon mirror for deflecting the laser beam in a uniform angular velocity, an f–θ lens for correcting so that the laser beam deflected in uniform angular velocity may be deflected in uniform speed on a photosensitive drum 48 of the electrophotographic process unit 47, and others.

The electrophotographic process unit 47 is composed, according to the known form, by arranging a charger, developer, transfer unit, releasing unit, cleaning unit, anti-static unit, and fixer 49 around the photosensitive drum 48. A conveying route 50 is provided at the conveying direction downstream side of the recording paper on which the image is formed by the fixer 49, and the conveying route 50 is branched off into a conveying route 57 communicating with the sorter 34, and a conveying route 58 communicating with the multi-stage paper feed unit 33.

The conveying route 58 is further branched off at the multi-stage paper feed unit 33, and as the conveying routes after branching off, an inverted conveying route 50a and a both-side/synthesizing conveying route 50b are provided.

The inverted conveying route 50a is a conveying route for inverting the face and back side of the recording paper in the both-side copy mode for copying both sides of the original. The both-side/synthesizing conveying route 50b is the conveying route for conveying the recording paper from the inverted conveying route 50a to the image forming position of the photosensitive drum 48 in the both-side copy mode, or conveying up to the image forming position of the photosensitive drum 48 without inverting the recording paper in the one-side synthesizing copy mode for making a synthesizing copy of forming different original images or images of different color toners on one side of the recording paper.

The multi-stage paper feed unit 33 includes a common conveying route 56, and the common conveying route 56 is designed to discharge the recording paper from the first cassette 51, second cassette 52 and third cassette 53 toward the electrophotographic process unit 47. The common conveying route 56 converges with a conveying route 59 from the fifth cassette 55 on the way to the electrophotographic process unit 47, and communicates with a conveying route 60.

The conveying route 60 converges with the bothside/ synthesizing conveying route 50b and conveying route 61 from the hand set original tray 45 on a convergence point 62, and communicates with the image forming device between the photosensitive drum 48 of the electrophotographic process unit 47 and the transfer device, and the convergent point 62 of these three conveying routes is located at a position near the image forming apparatus.

Therefore, in the laser writing unit 46 and electrophotographic process unit 47, the image data being readout from the memory are formed as an electrostatic latent image on the surface of the photosensitive drum 48 by scanning the laser beam by the laser writing unit 46, and the toner image made visual by the toner is electrostatically transferred and fixed on the surface of the recording paper conveyed from the multi-stage paper feed unit 33. The recording paper on which the image is thus formed is sent from the fixer 49 into the sorter 34 through the conveying routes 50 and 57, or conveyed into the inverted conveying route 50a through the conveying routes 50 and 58.

The constitution and function of the image processing unit included in the digital copier 30 of the embodiment are described below.

Figure 2:
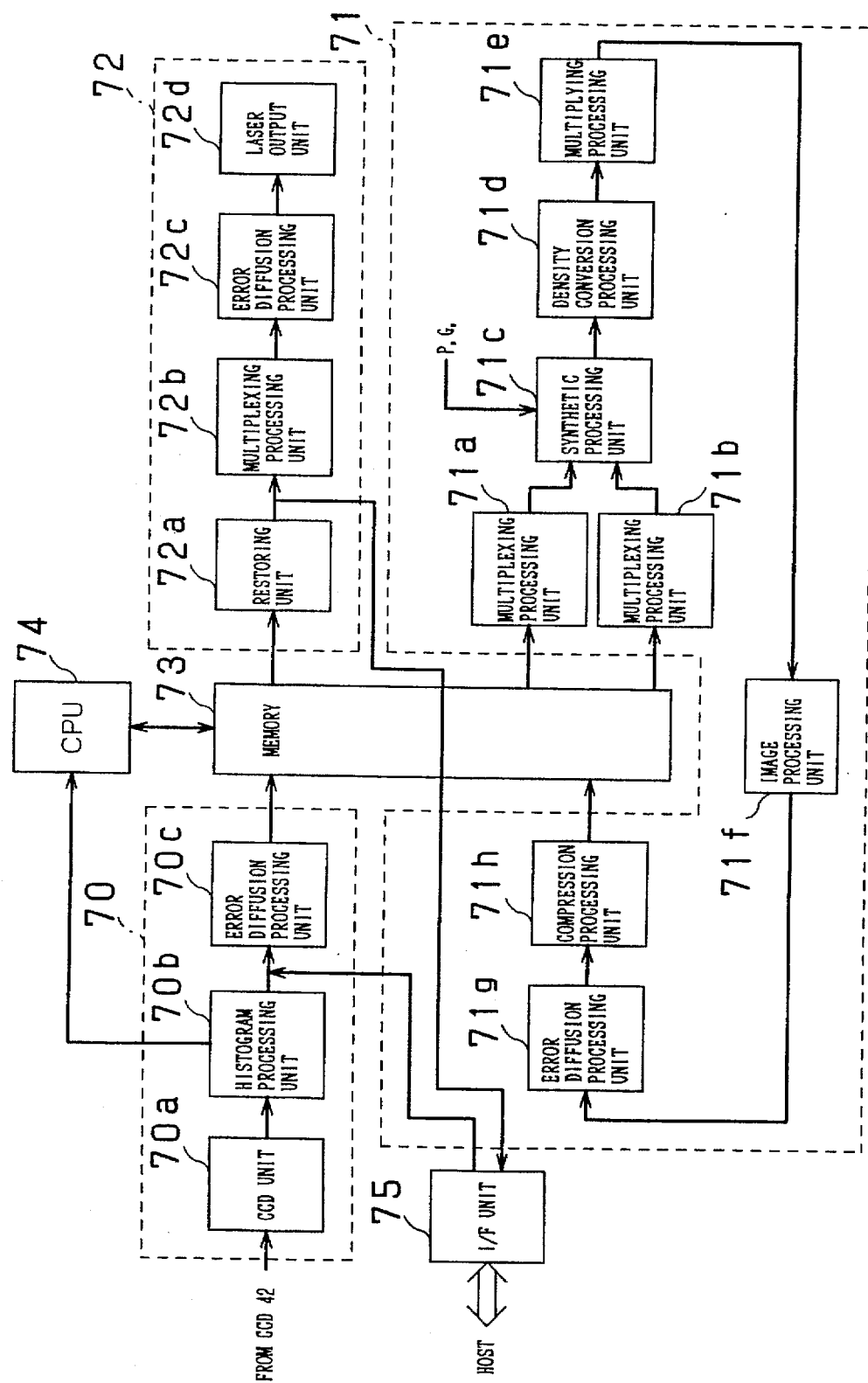
FIG. 2 is a block structural diagram of the digital copier 30.

FIG. 2 is a block structural diagram of the digital copier 30 of FIG. 1. The digital copier 30 comprises an image data input unit 70, an image processing unit 71, an image data output unit 72, a memory 73 composed of RAM (random access memory) and others, and a central processing unit (CPU) 74.

The image data input unit 70 comprises a CCD unit 70a, a histogram processing unit 70b, and an error diffusion processing unit 70c. The image data input unit 70 converts the image data of the original read in from the CCD 42 in FIG. 1 into binary form, and while taking a histogram as binary digital quantity, image data are processed by error diffusion method, and is once stored in the memory 73.

That is, in the CCD unit 70a, the analog electric signal depending on the density of each pixel of image data is A/D converted, and MTF correction, monochromatic correction or gamma correction is performed, and is outputted into the histogram processing unit 70b as digital signal of 256 gradations (8 bits). In the histogram processing unit 70b, the digital signal outputted from the CCD unit 70a is added by each pixel density of 256 gradations, and the density information (histogram data) is obtained, and, as required, the obtained histogram is sent into the CPU 74, or is sent to the error diffusion processing unit 70c as image data.

In the error diffusion processing unit 70c, by the error diffusion method which is a kind of spurious intermediate processing, that is, by the method of reflecting the binary coding error in the binary coding judgment of the adjacent pixel, the digital signal of 8 bits/pixel outputted from the CCD unit 70a is converted into 1 bit (binary), and redistribution operation is effected for reproducing the local region density of the original at high accuracy.

The image processing unit 7-1 comprises multiplexing processing units 71a and 71b, a synthetic processing unit 71c, a density conversion processing unit 71d, a multiplying processing unit 71e, an image process unit 71f, an error diffusion processing unit 71g, and a compression processing unit 71h. The image processing unit 71 is a processing unit for finally converting the input image data into the image data desired by the operator, and it is designed to process in this processing unit until stored as finally converted output image data in the memory 73. However, these processing units included in the image processing unit 71 function only when necessary and do not always function.

That is, in the multiplexing processing units 71a and 71b, the data converted into binary notation in the error diffusion processing unit 70c are converted again into 256 gradations. In the synthetic processing unit 71c, logic operations of each pixel, that is, OR, AND and exclusive-OR are selectively operated. The objective data of this operation are the image data stored in the memory 73 and the bit data from the pattern generator (PG).

In the density conversion processing unit 71d, for the digital signal of 256 gradations, the relation of the output density to the input density is set arbitrarily on the basis of the specified gradation conversion table. In the multiplying processing unit 71e, depending on the instructed multiplying factor, by interpolation processing by the input known data, the image data corresponding to the objective image after multiplying (the density value) are determined, and after the subsidiary scanning is multiplied, the main scanning is multiplied.

In the image process unit 71f, various image processing operations are done on the input image data, and the information processing with respect to the feature extraction and other data row can be executed. In the error diffusion processing unit 71g, similar processing as in the error diffusion processing unit 70c of the image data input unit 70 is executed.

In the compression processing unit 71h, binary data are compressed by coding known as run length. In compression of image data, compression functions in the final processing loop when the final output image data are completed.

The image data output unit 72 comprises a restoring unit 72a, a multiplexing processing unit 72b, an error diffusion processing unit 72c, and a laser output unit 72d. The image data output unit 72 is designed to restore the image data stored in the memory 73 in compressed state to convert again into original 256 gradations, and perform error diffusion of quaternary data as smoother halftone expression than binary data, and transfer the data to the laser output unit 72d.

That is, in the restoring unit 72a, the image data compressed by the compression processing unit 71h is restored. In the multiplexing processing unit 72b, same processing as in the multiplexing processing units 71a and 71b of the image processing unit 71 is performed. In the error diffusion processing unit 72c, same processing as in the error diffusion processing unit 70c in the image data input unit 70 is done. In the laser output unit 72d, on the basis of the control signal from the sequence controller, not shown, the digital image data are converted into laser on/off signal, and the laser is set in on or off state.

The data handled in the image data input unit 70 and image data output unit 72 are stored in the memory 73 in a form of binary data, basically, for saving the capacity of the memory 73, but in consideration of the deterioration of image data, it is also possible to process in a form of quaternary data. Next, explaining the interface unit, the data sent from the host realized by the computer or the like are taken into the I/F unit 75, and are sent out into the error diffusion processing unit 70c of the image data input unit 70, and are those stored in the memory 73 same as in the above processing, and printed out in the image data output unit 72. After passing the image data of the memory 73 through the restoring unit 72a of the image data output unit 72, it is sent into the I/F unit 75, and the image data are sent into the host, and hence the image data from the image data input unit 70 can be taken into the host.

Figure 3:
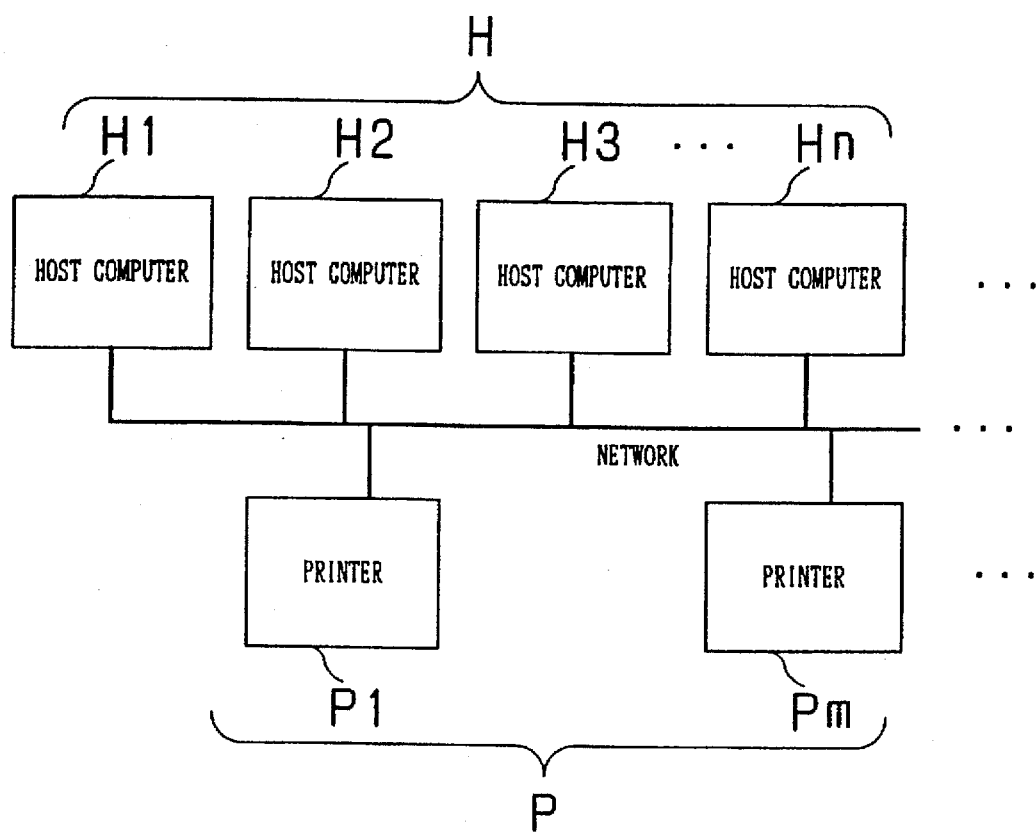
FIG. 3 is a diagram showing a general network configuration of a host computer H and a printer P.

FIG. 3 shows a general network configuration of host computer H and printer P realized by the digital copier 30 or the like, in which plural host computers H1 to Hn and plural printers P1 to Pm are connected, and data are exchanged between the host computers H1 to Hn, and data are printed from the host computers H1 to Hn to printers P1 to Pm. Depending on the scale of the system configuration, it ranges from a system of one host computer and one printer, to a system of n host computers and m printers, and also a server system having other plural host computers connected to a host computer. The printer is also wide in range, from the single function machine, to multiple-function machine for processing by storing image data from the host computer, such as digital copier.

Figure 4:
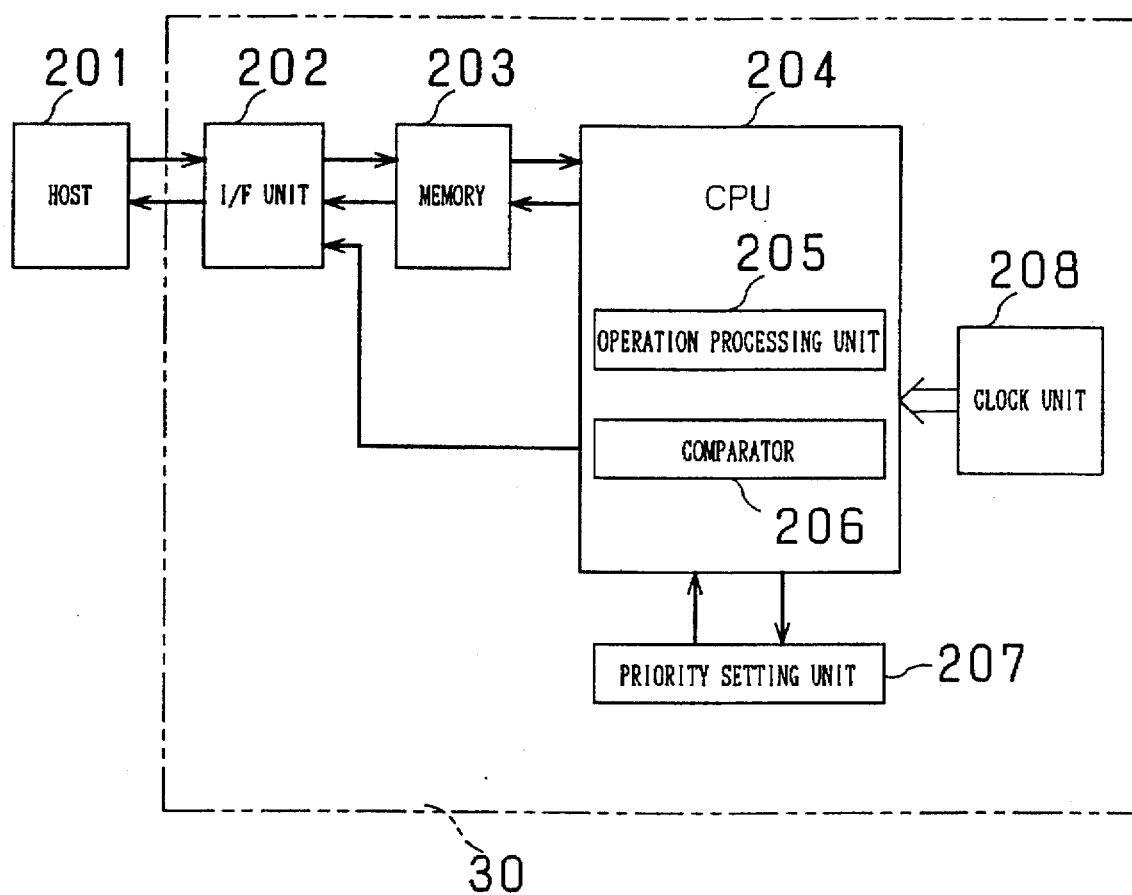
FIG. 4 is a block diagram of each control of the digital copier 30 used in a network configuration.

FIG. 4 is a block diagram of each control of the digital copier 30 of the invention applied as printer P in such network configuration as mentioned above, in which reference numeral 201 is a host (each terminal device) realized by a computer or the like, 202 is an I/F unit corresponding to the I/F unit 75, and 203 is a memory corresponding to the memory 73. In a CPU 204 corresponding to the CPU 74, an operation processing unit 205 and a comparator 206 are provided, and the CPU 204 exchanges data with the priority setting unit 207. The clock unit 208 feeds the time data into the CPU 204.

Figure 5:
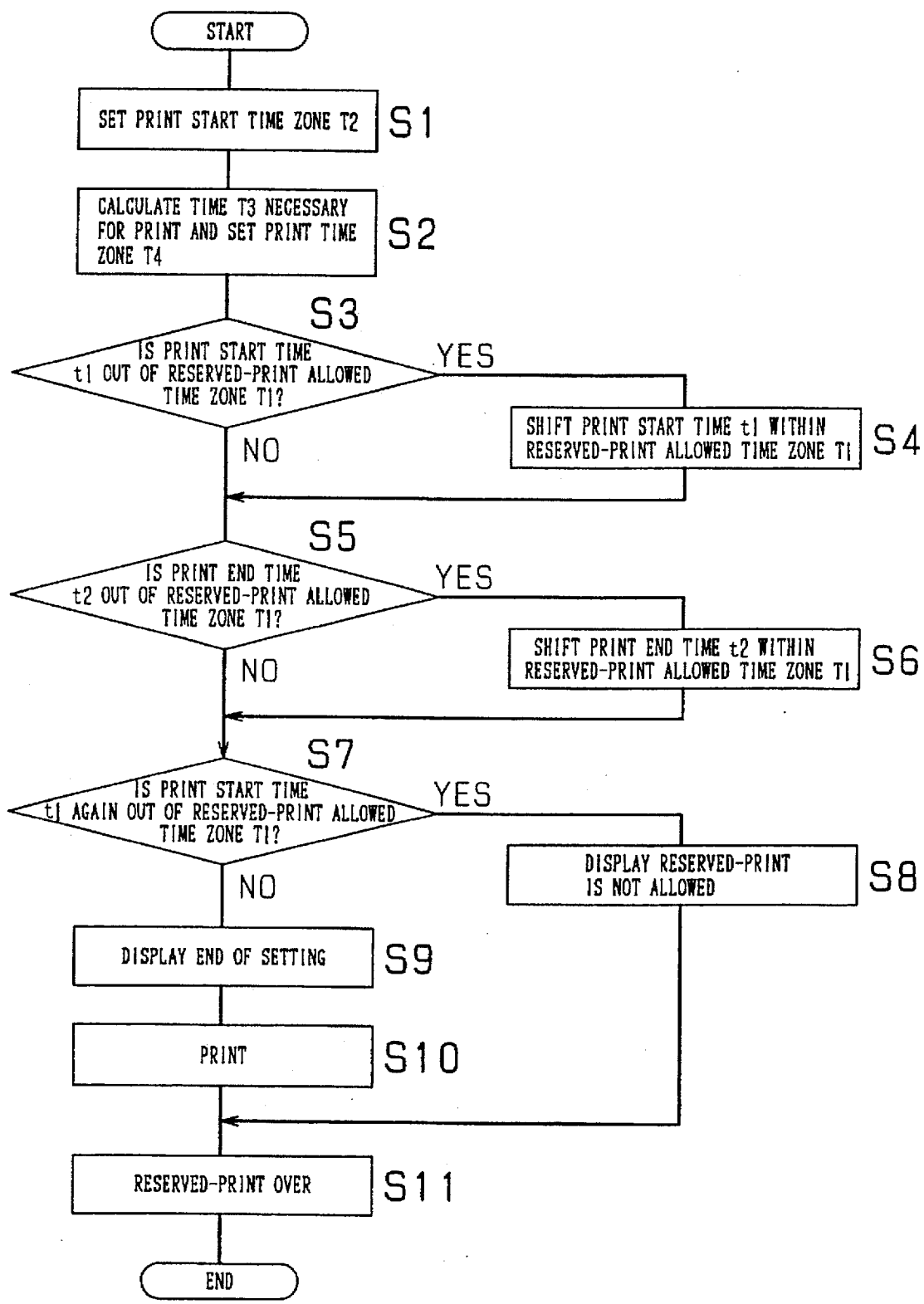
FIG. 5 is a flowchart showing operation of reserved print function in embodiment 1.
Figure 6:
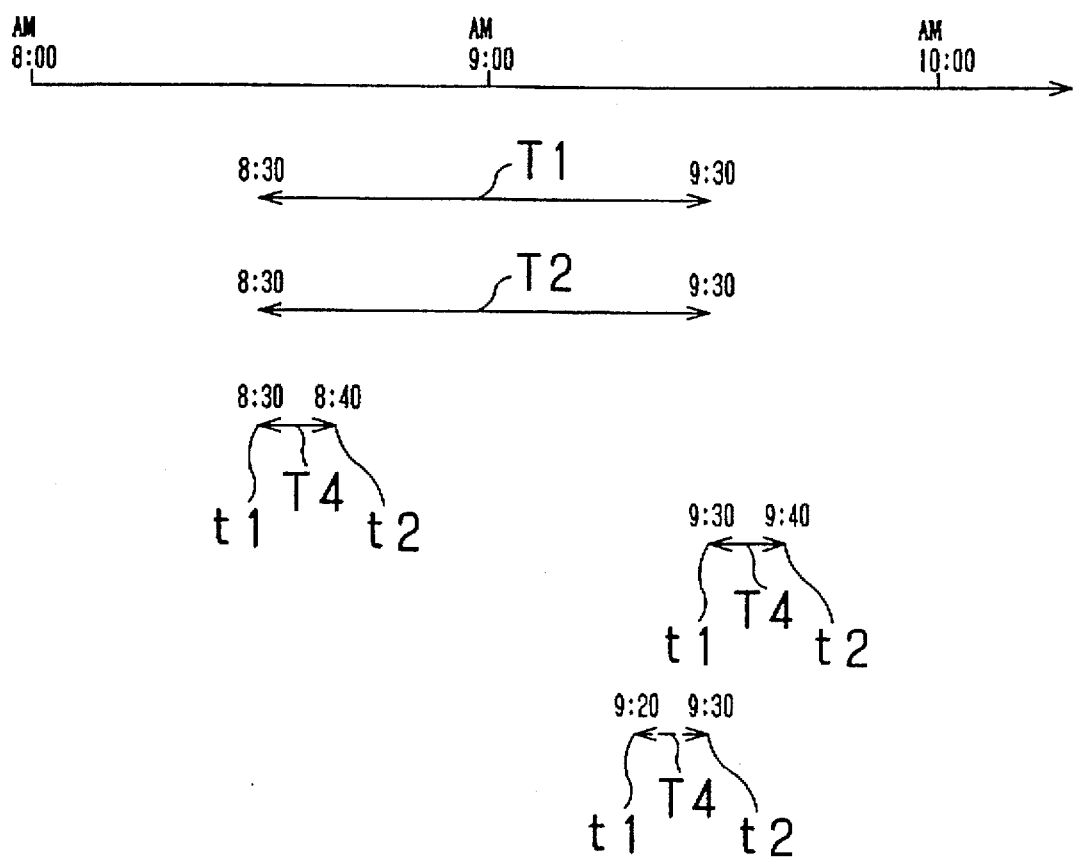
FIG. 6 is a diagram showing an example of time zone set by this function.

FIG. 5 is a flowchart showing the operation of the reserved print function in embodiment 1. FIG. 6 is a diagram showing an example of time zone set by this function.

In the execution of this operation, for example, by the setting action mentioned below, it is supposed that the preserved print allowed time zone T1 is set preliminarily. The preserved print allowed time zone T1 is set in a time zone excluding the time zone judged to be busy in ordinary printing of printing without reservation, and it set, for example, in the time zone corresponding to Sunday of a week or the lunch recess of a day. As in this embodiment, it may be set near the starting time of business hours (for example, 8:30 to 9:30 a.m.) or near the closing time of business hours (for example, 4:30 to 9:00 p.m.).

First, from the host computer 201, print data are sent out toward the digital copier 30 which is a printer P. The transmitted print data are sent and processed in the error diffusion processing unit 70c of the image data input unit 70 shown in FIG. 2 through the I/F unit 202, and are stored in the memory 203.

At step S1, in the digital copier 30, after selecting execution of reserved print function, the print start time zone T2 is set. The print start time zone T2 expresses the allowable range of the print start time of data, and in the case of the print needed by 10:00 a.m., the time zone is set so as to start printing somewhere between 8:30 and 9:30 a.m. Although the print start time zone T2 can be set regardless of the reserved print allowed time zone T1, this print start time zone T2, like the reserved print allowed time zone T1, is set in the time zone excluding the busy time zone of ordinary printing.

The reserved print allowed time zone T1 is set in an arbitrary time zone, and on the other hand the print start time zone T2 is individually set for reserved print data. Substantially the print start time T2 is set within the reserved print allowed time zone T1. In other words, in the embodiment, the print start time zone T2 is set for individual reserved print data within the reserved print allowed time zone T1 in order to smoothly print the print data as well as to avoid overlapping of the function as a printer and the function as a copier.

At step S2, the time required for printing T3 is calculated in the operation processing unit 205, and the print time zone T4 is set. The time required for printing T3 is calculated from the quantity of data to be printed and the printing speed of the digital copier 30, and, for example, when the data quantity to be printed is 10 pages, and the printing speed is 10 pages per minute, the time required for printing T3 is 1 minute. The calculated time required for printing T3 is set as the print time zone T4, corresponding to the print data, on the same axis on which the reserved print allowed time zone T1 and print start time zone T2 are set. The print time zone T4 is set in an arbitrary time zone, for example, in the time zone in which other print is not set, and when printing operation is active at the present, it is set in other time zone. In execution of this operation, it is supposed that the power source of the digital copier 30 is always turned on.

At step S3, it is judged in the comparator 206 whether the print start time ti of the print time zone T4 is out of the reserved print allowed time zone T1 or not. If out of the zone, at step S4, setting of the print time zone T4 is shifted so that the print start time t1 may be within the reserved print allowed time zone T1.

If judged to be within the zone at step S3 or when processing of step S4 is over, at step S5, the comparator 206 judges whether the print end time t2 of the print time zone T4 is out of the reserved print allowed time zone T1 or not. If out of the zone, at step S6, setting of the print time zone T4 is shifted so that the print end time t2 may be within the reserved print allowed time zone T1. For example, when the time required for printing T3 is 10 minutes and the print time zone T4 is set in a range of 8:30 to 8:40 a.m., judgment at step S3 is negative, and the judgment at step S5 is also negative. Therefore, the print time zone T4 is set in the same range of 8:30 to 8:40 a.m. In the case of time required for printing T3 of 10 minutes and print time zone set T4 in a range of 9:30 to 9:40 a.m., judgment at step S3 is negative while judgment at step S5 is affirmative. Therefore, the print time zone T4 is shifted at step S6, and is set, for example, in a range of 9:20 to 9:30 a.m.

If judged to be within the zone at step S5 or when processing of step S6 is over, at step S7, the comparator 206 judges again if the print start time t1 of the print time zone T4 is out of the reserved print allowed time zone T1 or not. If out of the zone, at step S8, incapability of reserved print is displayed, for example, in the display unit in the operation panel of the digital copier 30 to tell the operator. If within the zone, at step S9, setting of reserved print is noticed to the operator by displaying, for example, in the display unit.

At step S10, when the print start time t1 in the present print time zone T4 and the time measured by the clock 208 coincide, print data set by reservation are printed. At step S10 and when the operation at step S8 is over, execution of reserved print function is terminated at step S11.

Figure 7:
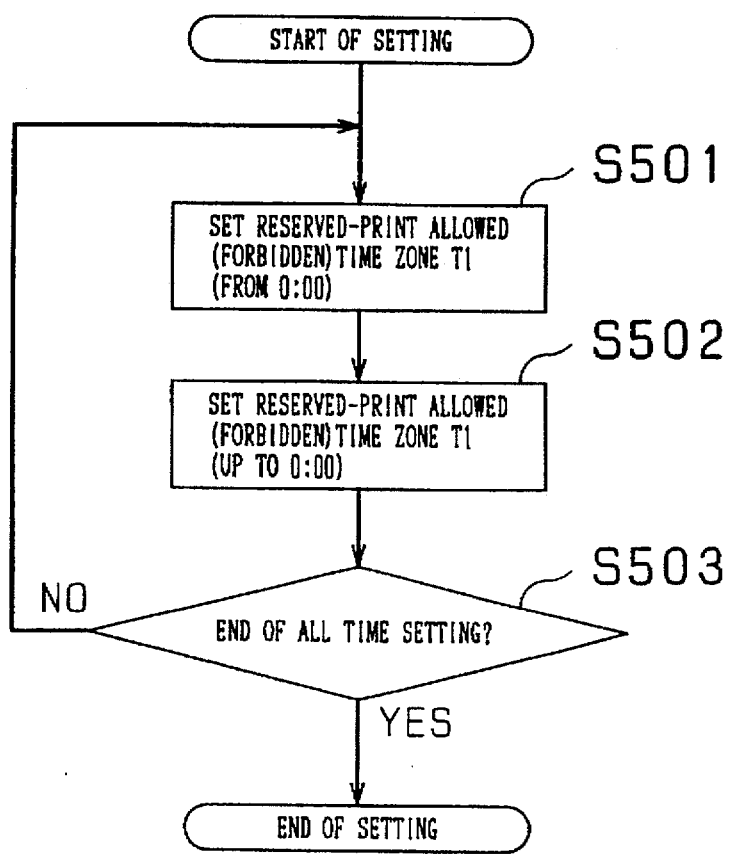
FIG. 7 is a flowchart showing setting operation of reserved print allowed time zone T1.
Figure 8:
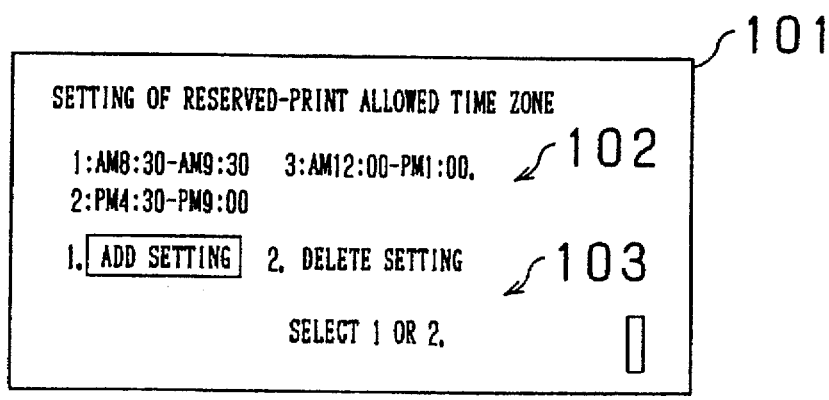
FIG. 8 is a diagram showing an example of display screen 101 shown in a display unit of an operation panel of the digital copier 30, when setting reserved print allowed time zone T1.

FIG. 7 is a flowchart showing the setting operation of the reserved print allowed time zone T1. FIG. 8 is a diagram showing an example of display screen 101 shown in the display unit of the operation panel of the digital copier 30 when setting the reserved print allowed time zone T1. Prior to execution of the operation of the reserved print function explained in FIG. 5, the reserved print allowed time zone T1 is set by the operation as explained in FIG. 7. The reserved print allowed time zone T1 is not limited to one, but a plurality may be set. This embodiment relates to setting of at least two print allowed time zones T1.

At step S501, as first reserved print allowed time zone T1, for example, 8:30 to 9:30 a.m. is set. At step S502, as second reserved print allowed time zone T1, for example, 12:00 a.m. to 1:00 p.m. is set. At step S503, judging whether there is any other setting of reserved print allowed time zone T1, and if none, setting is terminated, and if present, the operation returns to step S501.

The preset reserved print allowed time zones T1 are individually displayed in a display region 102 of the display screen 101. If there is other reserved print allowed time zone T1 or the reserved print allowed time zone T1 requires deletion or change, the operator manipulates to set according to the message displayed in the display region 103 of the display screen 101. For example, when the operator select the conditions by using the operation key of the operation panel, the set time zone can be added or deleted.

Figure 9A:
FIG. 9A to FIG. 9F are diagrams showing examples of other display screens 104 to 109 shown in the display unit of the operation panel.
Figure 9B:
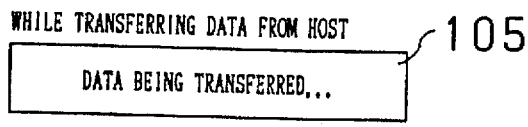
Figure 9C:
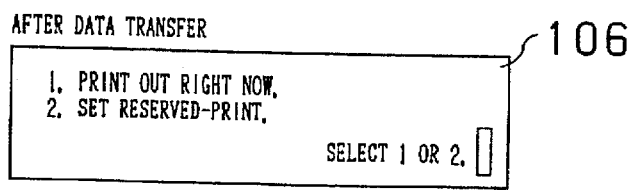

FIGS. 9A to 9F are diagrams showing examples of other display screens 104 to 109 shown in the display unit of the operation panel. The display screen 104 shown in FIG. 9A shows that execution of the function as the printer, not copying function, is set. The display screen 105 shown in FIG. 9B shows that the print data are sent out from the host computer 201 toward the digital copier 30, before execution of the operation explained in FIG. 5. The display screen 106 shown in FIG. 9C shows that the transfer of print data to be sent out from the host computer 201 toward the digital copier 30 is terminated, before execution of the operation explained in FIG. 5, and this display screen 106 also urges the operator to select either to print right after completion of transfer, or to print by reservation. The operator selects the printing condition by using, for example, the operation key in the operation panel.

Figure 9D:
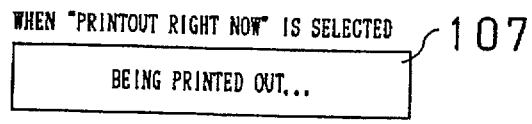
Figure 9E:
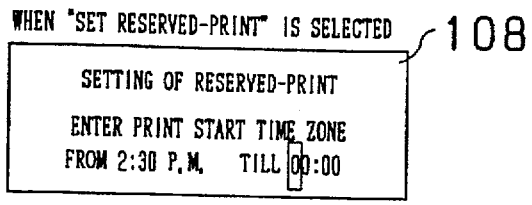
Figure 9F:
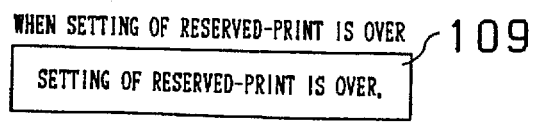

The display screen 107 shown in FIG. 9D is displayed when it is selected to display right after termination of transfer on the display screen 106, and it shows the process of printing. The display screen 108 shown in FIG. 9E is shown when reserved print is selected on the display screen 106, and is shown at step S1 explained in FIG. 5, urging the operator to set the print start time zone T2. The operator, for example, sets the print start time zone T2 by using the operation key of the operation panel. The display screen 109 shown in FIG. 9F is shown at step S9 in FIG. 5, telling that the setting of reserved print is over.

(Embodiment 2)

Figure 10:
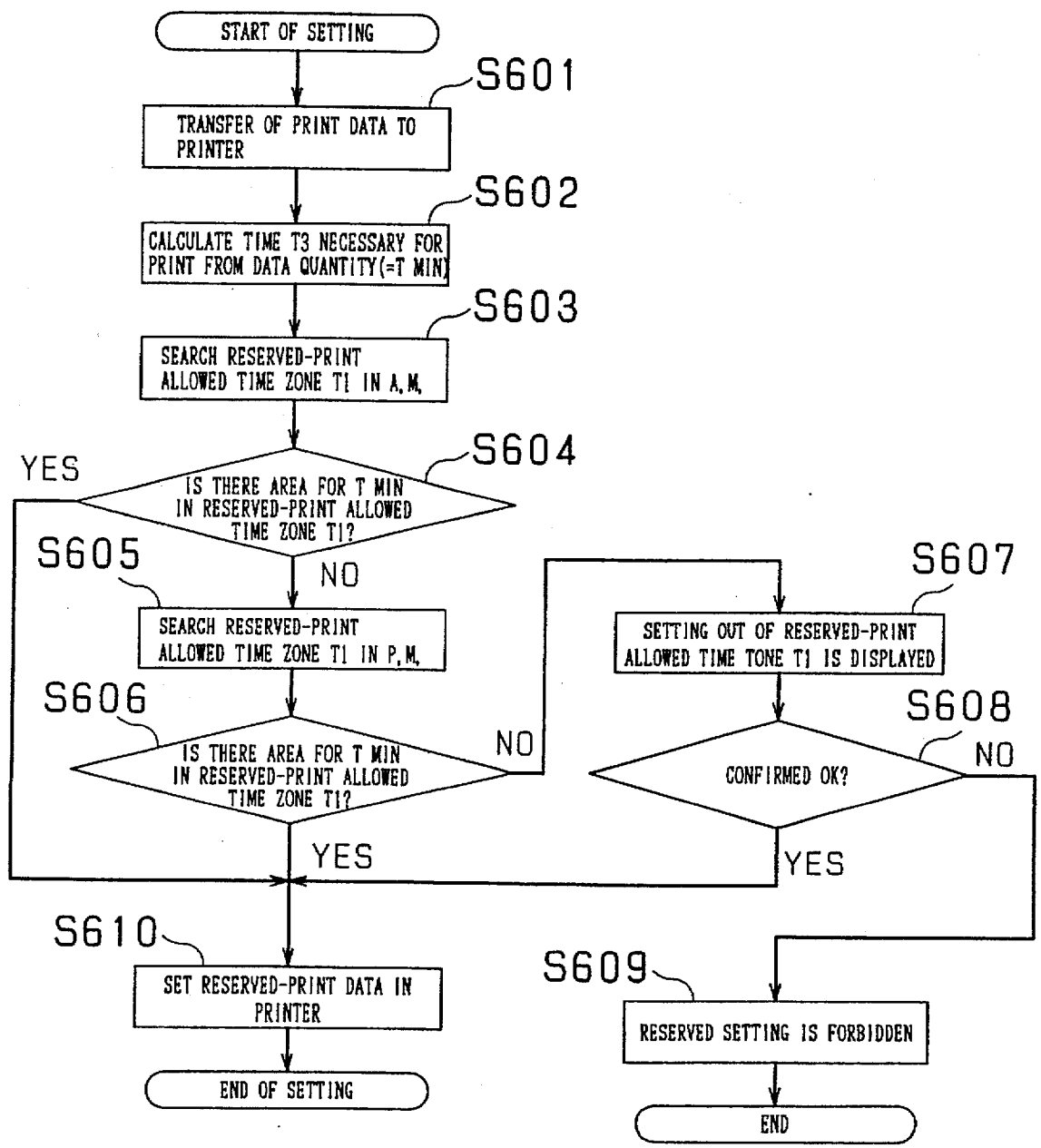
FIG. 10 is a flowchart showing operation of reserved print function in embodiment 2.

Other embodiment of the invention is described by referring to FIG. 10. FIG. 10 is a flowchart showing the operation of the reserved print function of embodiment 2. Whereas embodiment 1 related to an example of setting the print start time zone T2, embodiment 2 is an example of not desiring setting of the print start time zone T2. That is, only by transferring the print data to the digital copier 30 from the host computer 201 side, the digital copier 30 automatically calculated the time required for printing T3 from the print data quantity and the printing speed, and the print time zone T4 is set in the time zone for efficiently printing within the reserved print allowed time zone T1, thereby processing reserved print.

At step S601, the print data are transferred to the digital copier 30. At step S602, the time required for printing T3 is calculated from the data quantity of the transferred print data and the printing speed. At step 3603 an optimum time zone within the reserved print allowed time zone T1 is searched. For example, an optimum time zone within the morning (before noon) is searched. At step S604, it is judged whether there is an appropriate time zone or not, and at step S610 if judged affirmatively, the print data are set in the digital copier 30 by reservation. At step S605 if judged that there is no appropriate time, an appropriate time zone is searched in the afternoon (p.m.). At step S606, it is judged whether there is any appropriate time zone, and if judged affirmatively, the operation goes to step S610.

At step S607 if there is no appropriate time zone at step S606, the display screen urging the operator to select whether or not to set so as to print in the time zone other than the reserved print allowed time zone T1 is shown, for example, in the display unit of the operation panel of the digital copier 30. At step S608, it is judged whether or not to print in the time zone other than the reserved print allowed time zone T1, and when judged to print, the operation advances to step S610. If judged not to print, advancing to step S609, setting operation of reserved print is stopped.

(Embodiment 3)

Figure 11:
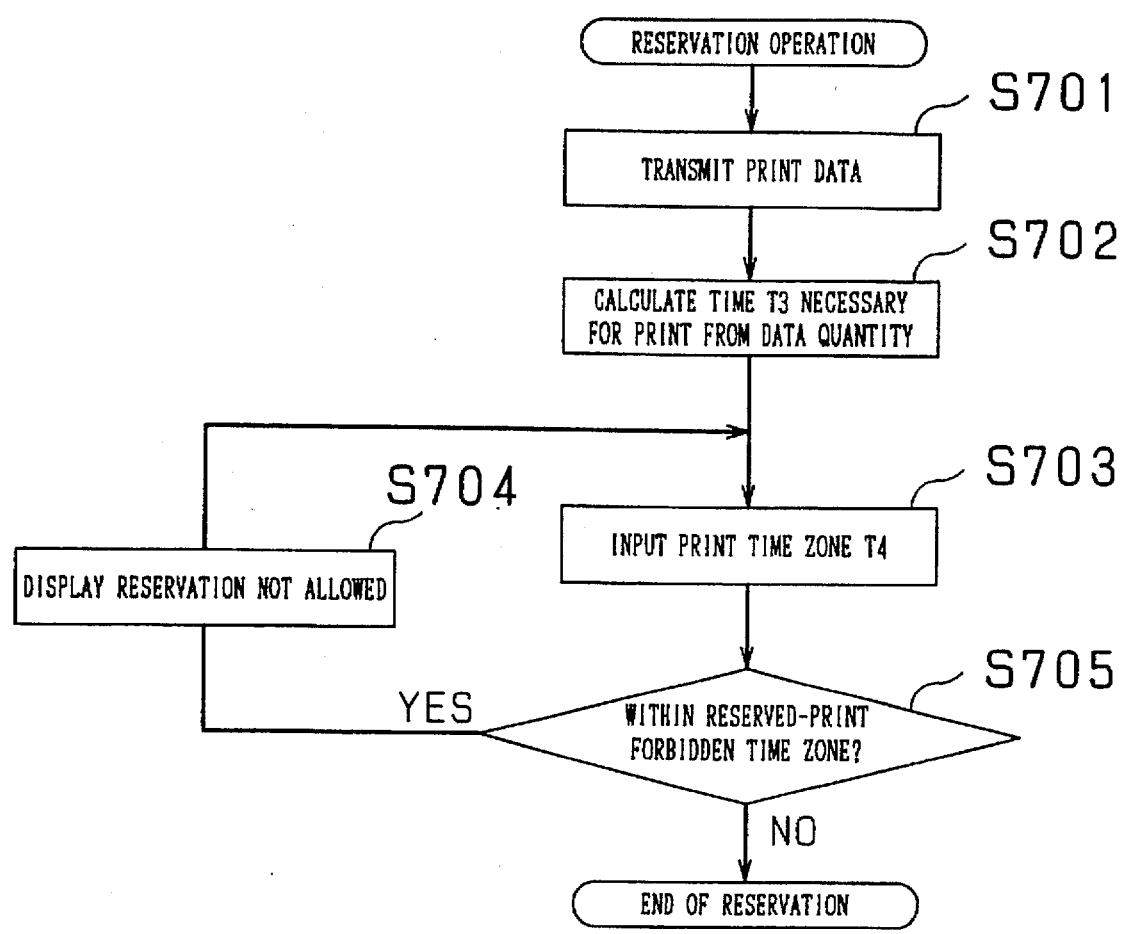
FIG. 11 is a flowchart showing operation of reserved print function in embodiment 3.

A different embodiment of the invention is described while referring to FIG. 11. FIG. 11 is a flowchart showing the operation of reserved print function in embodiment 3. In embodiment 3, the reserved print forbidden time zone is preset at the digital copier 30 side, and when the present print time zone T4 is within the reserved print forbidden time zone, it is warned that reserved print is not allowed.

That is, by contrast to embodiment 1, the busy time zone as the copier at the printer size (for example, 9:30 to 10:00 a.m., or 1:00 to 3:00 p.m. in a day, and other days than Saturday and Sunday of a week) is set as reserve print forbidden time zone in the printer side beforehand, and when the set print time zone T4 is within the forbidden time zone, display of reservation not allowed (warning) is made in the operation unit. Incidentally, the reserved print forbidden time zone can be set same as in the setting operation of the reserved print allowed time zone T1 explained in FIG. 7.

At step S701, the print data are transferred to the digital copier 30. At step S702, the time required for printing T3 is calculated from the data quantity of the transferred print data and the printing speed. At step S703, the print time zone T4 is set. At step S705, it is judged whether the set print time zone T4 is within the reserved print forbidden time zone or not. If judged to be within the zone, advancing to step S704, it is warned that reserved print is not allowed. For example, it is displayed and warned in the display unit of the operation panel of the digital copier 30. When operation at step S704 is over, the operation returns to step S703. When it is judged that the print time zone T4 set at step S705 is not within the reserved print forbidden time zone, setting operation of reserved print is over.

(Embodiment 4)

Figure 12:
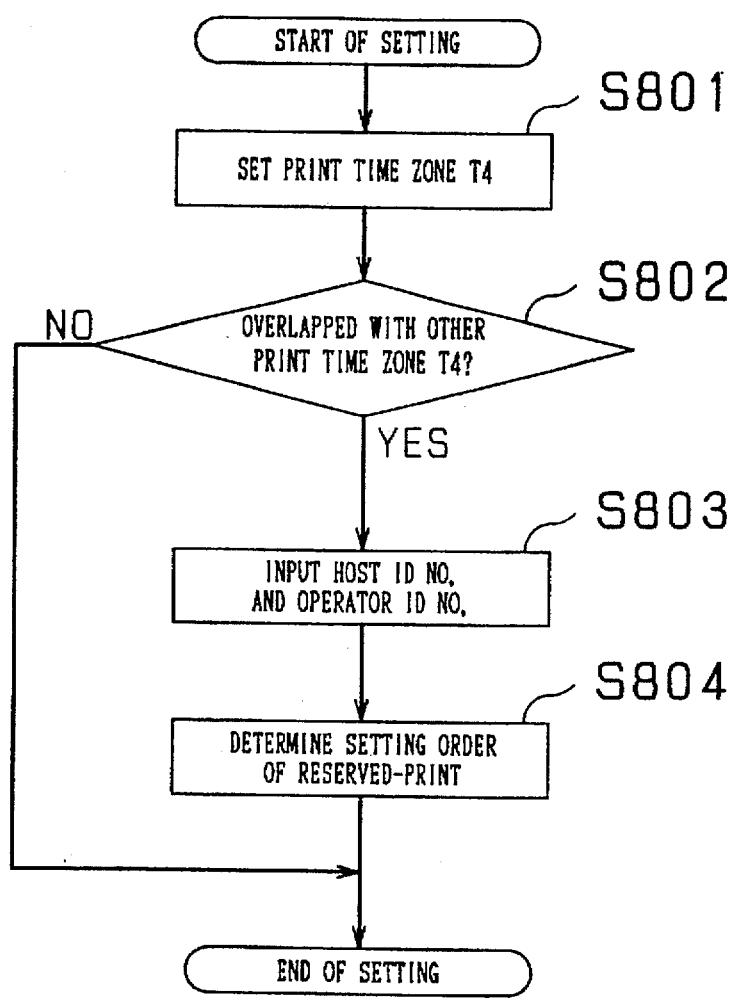
FIG. 12 is a flowchart showing operation of reserved print function in embodiment 4.

A further different embodiment of the invention is described by referring to FIG. 12. FIG. 12 is a flowchart showing operation of reserved print function in embodiment 4. Embodiment 4 is intended to print in a predetermined priority order when the print time zones T4 are overlapped. The priority order is set in a priority order setting unit 207 corresponding to the print data. For example, when plural host computers 201 are connected, ID codes of the host computers 201 are set in the priority order setting unit 207 according to a predetermined priority order, and the priority order is set for each print data of the host computers. When used by plural operators, the ID codes of operators are set in the priority order setting unit 207 in a predetermined priority order, and the priority order is set in each print data of operators.

That is, by the reserved print processing explained in embodiment 1 and embodiment 2, when plural reserved print time zones T4 are overlapped, without printing in the preset order, the priority order is set in every setting of reserved print, and it is processed to print at desired printing time according to the priority order, and, for example, if plural host computers H1, H2, H3 are connected, host H1 has priority over hosts H2 and H3, and host H2 is over host H3, and in this way the ID code of the host side is set preliminarily in the priority order setting unit 207.

When setting reserved print, the ID codes of operators (for example, S1, S2, S3, S4 in the office post order, or B1, B2, B3, B4 by the technical departments, etc.) are entered from the host. The entered ID codes are compared with the priority data already entered in the priority order setting unit 207 in the comparator 206, and the setting order of the reserve print mode is determined, and reserved print is processed when reaching the print time.

At step S801, same as in embodiment 1 or 2, the print time zone T4 is set. At step S802, it is judged whether the preset print time zone T4 and the print time zone T4 set at step S801 are overlapped or not. If judged to be overlapped, at step S803, the ID code of the host computer 201 is entered. The operator's ID code is entered. At step S804, the overlapped print time zones T4 are set in the priority order on the basis of the ID codes of the host computers or operators. When judged not overlapped at step S802, or when operation is over at step S804, the setting operation of reserved print is over.

(Embodiment 5)

Figure 13:
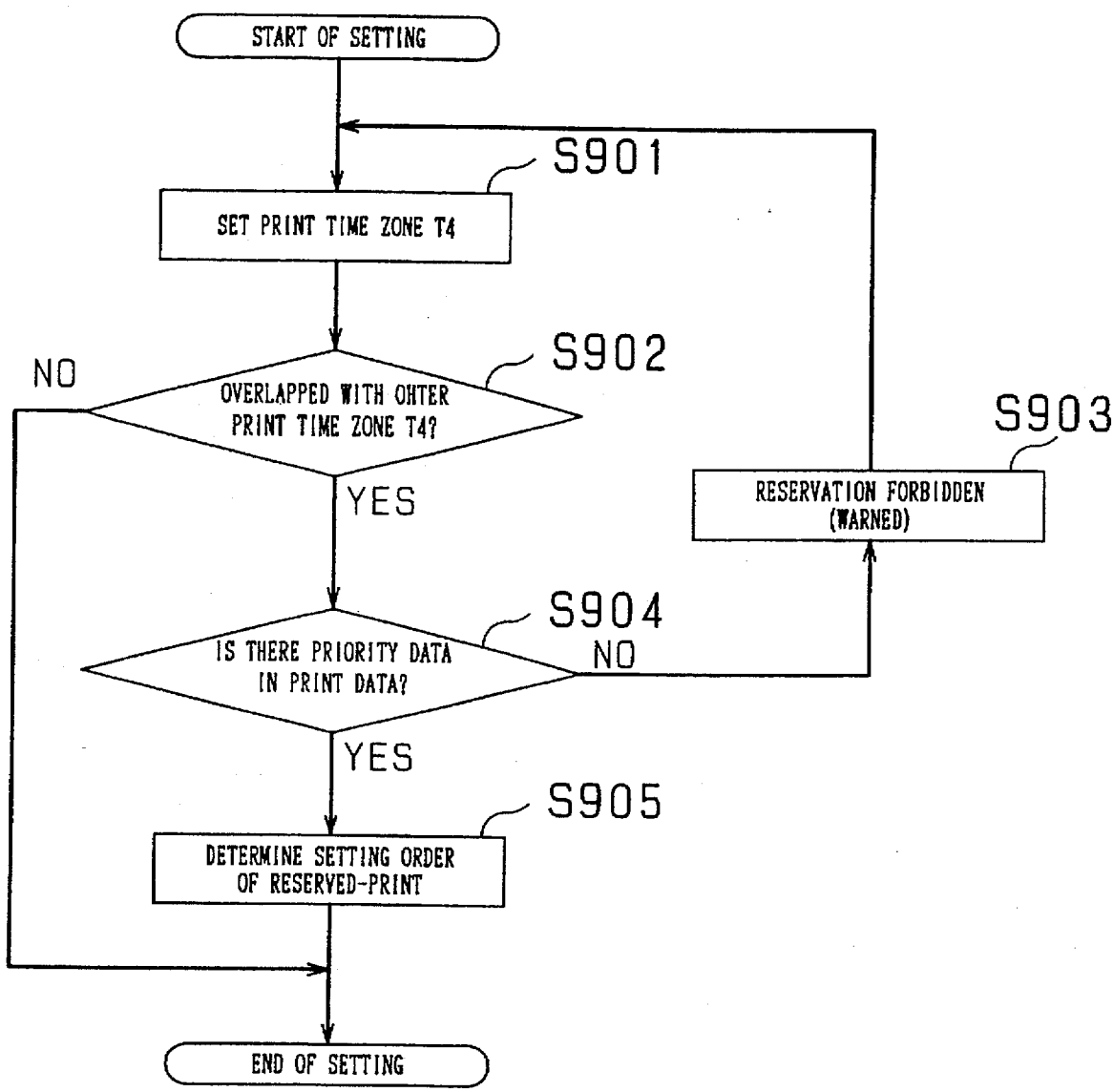
FIG. 13 is a flowchart showing operation of reserved print function in embodiment 5.

Another different embodiment of the invention is described below while referring to FIG. 13. FIG. 13 is a flowchart showing operation of reserved print function of embodiment 5. Embodiment 5 is an example similar to embodiment 4. That is, when the print time zones T4 are overlapped, it is intended to print in a predetermined priority order other than the ID codes, and the priority order is set in the priority order setting unit 207, and predetermined priority character data such as urgent or rush are set in the priority order setting unit 207.

At step S901, the same as in embodiment 5, the print time zone T4 is set. At step S902, it is judged whether the already set print time zone T4 and the print time zone T4 set at step S901 are overlapped or not. If judged overlapped, at step S904, it is judged whether priority character data are entered or not. If judged to be entered, at step S905, it is set so that the print data marked with priority character data may be printed by priority. At step S903 when it is judged that priority character data are not entered at step S904, it is warned that reserved print is not allowed, and the operation returns to step S901. At step S902, if the preset print time zone T4 and the print time zone T4 set at step S901 are judged to be not overlapped, or when the operation is over at step S905, the setting operation of reserved print is terminated.

Thus, this embodiment is a variation of embodiment 4, and similarly by setting character data such as urgent or rush as priority character data, it is searched whether there is any priority character data in the transmitted reserved print data, and if found, the data are set at the beginning of the other set reserved print data by interruption (S901, S902, S904, S905). If not found, reservation is banned (warned) (S903). As a result, the priority order is determined on the basis of the priority character data of the reserved print data, and therefore printing in the desired order according to the priority order is enabled.

(Embodiment 6)

Figure 14:
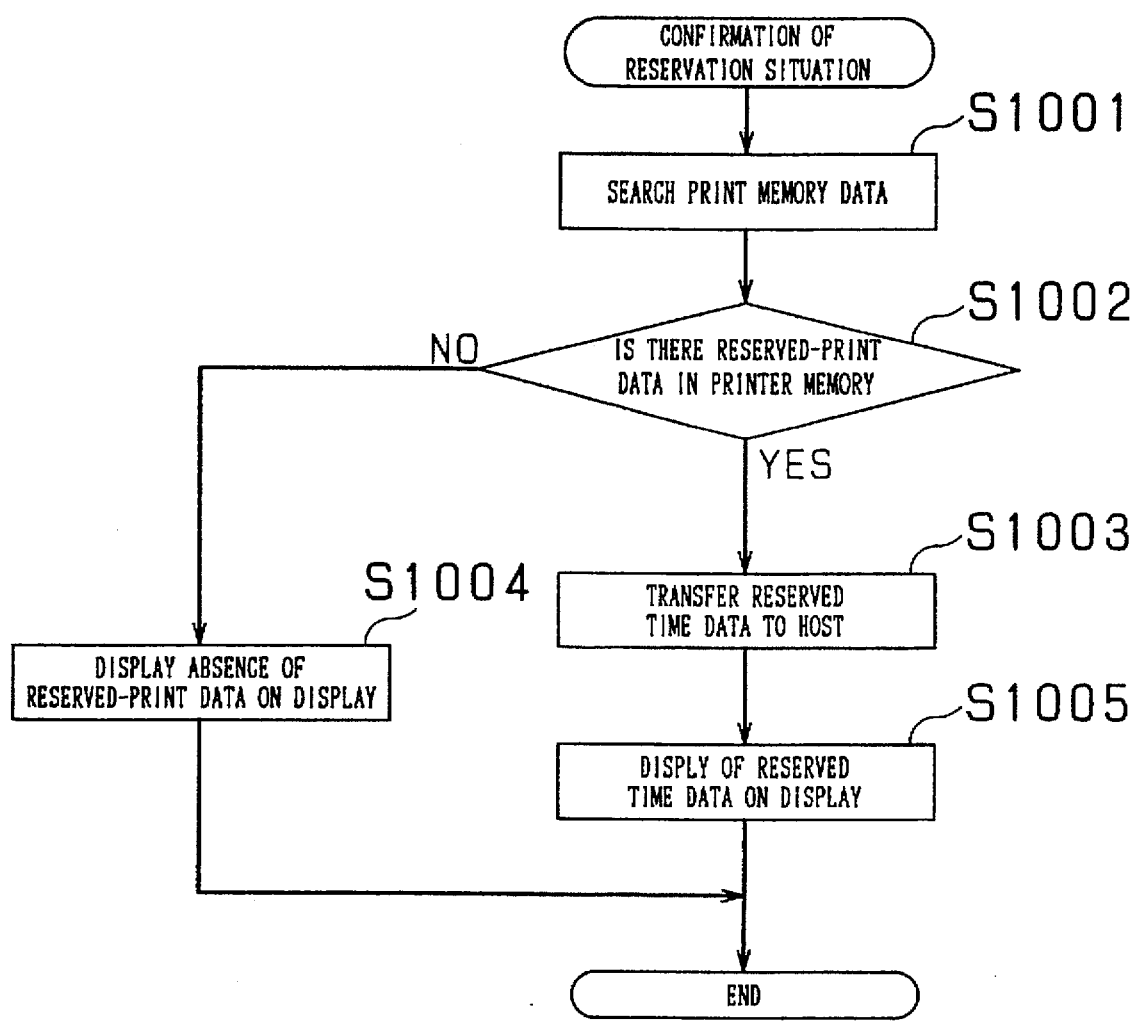
FIG. 14 is a flowchart showing operation of reserved print function in embodiment 6.

A further different embodiment of the invention is described by reference to FIG. 14. FIG. 14 is a flowchart showing operation of reserved print function of embodiment 6. Embodiment 6 is intended to confirm the present reservation status at the host computer 201 before setting reserved print.

At step S1001, data in the memory 203 are searched. At step S1002, it is judged whether reserved print data is present in the memory 203 or not. If judged to be present, at step S1003, the reserved time information of the reserved print data is transferred to the host computer 201. At step S1005, the transferred reserved time information is displayed on the display provided in the host computer 201. At step S1004 where it is judged that the print data reserved at step S1002 is not present, that the reserved print data is not present is displayed on the display provided in the host computer 201. Herein the reserved time information includes the print time zone T4, print start time t1 and print end time t2.

As in this embodiment, when confirmation of reservation situation is selected before setting the reserved print from the host computer 201, the reserved time information of other reserved print data presently stored in the memory 203 of the digital copier 30 such as printer can be read out and shown on the display of the host computer 201 to display presence or absence of reservation, so that setting of reserved print can be done smoothly (S1001 to S1005). As a result, the present reservation situation is easily known by the indication from the host computer 201, and the controllability of reserved print setting is enhanced.

(Embodiment 7)

Figure 15:
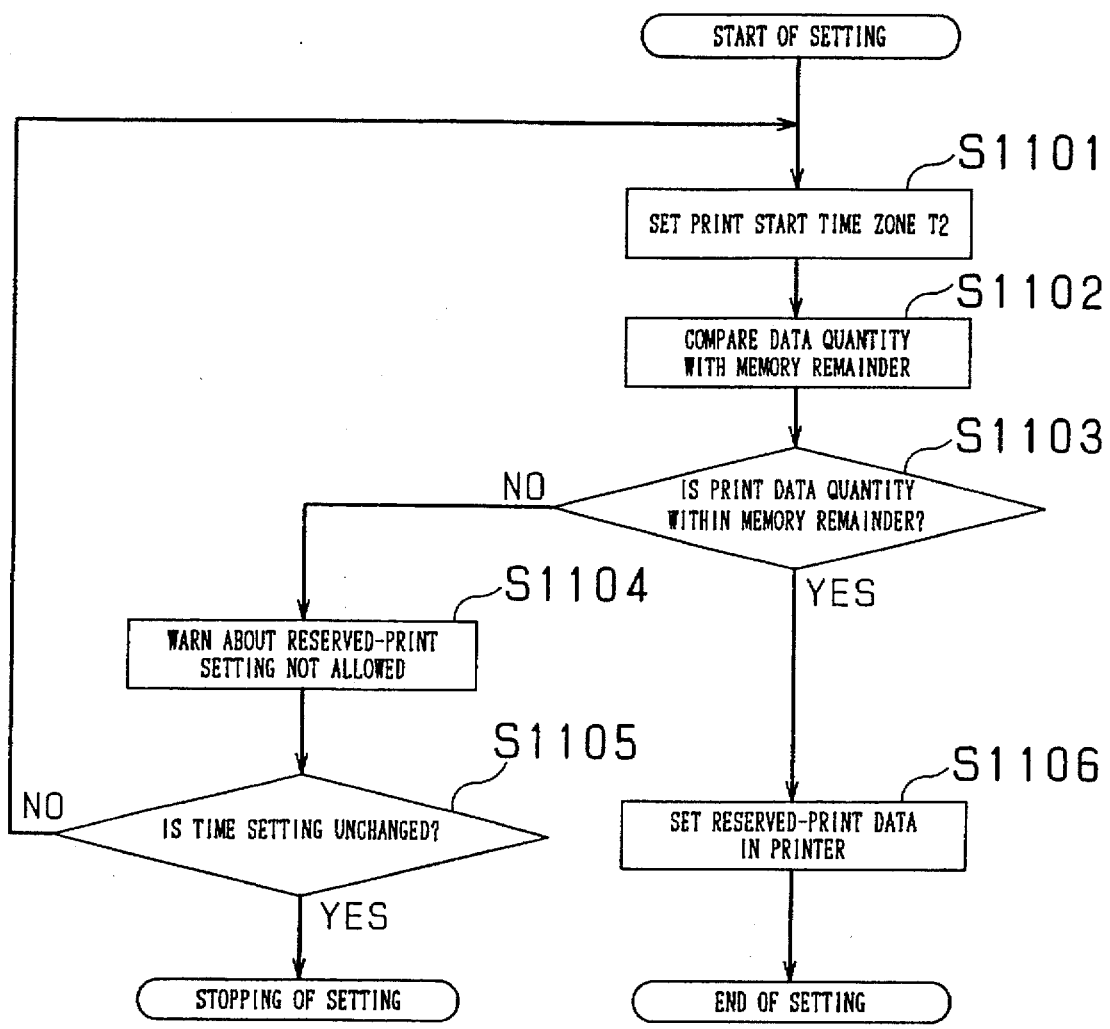
FIG. 15 is a flowchart showing operation of reserved print function in embodiment 7.

A still further embodiment of the invention is described by referring to FIG. 15. FIG. 15 is a flowchart showing the operation of reserved print function in embodiment 7. Embodiment 7 is characterized by allowing to confirm the situation (the memory remainder) in the memory 203 of the digital copier 30 by the host computer 201 when reserving printing.

At step S1101, print start time zone T2 is set. At step S1102, the data quantity of print data transferred from the host computer 201 and the memory remainder of the memory 203 are compared. At step S1103, it is judged whether the data quantity of the print data is within the memory remainder of the memory 203 or not. If judged to be within, at step S1106, the print data is reserved and set in the digital copier 30, and setting action of reserved print is over.

At step S1103, if the data quantity of the print data is judged not to be within the memory remainder of the memory 203, at step S1104, it is warned that reserved print is not allowed. At step S1105, it is judged whether the print time is changed or not, and when not changing, setting action of reserved print is over. When changing, the process returns to step S1101.

Alternatively, according to the embodiment, when setting reserved print, while referring to the situation of the memory 203 (the memory remainder) of the digital copier 30 as a printer, it is compared with the data quantity of the transferred reserved print data, and whether reserved print is allowed or not is judged and displayed, and when the remainder of the memory 203 is less than a specific value, it is displayed (warned) that setting of reserved print is not allowed on the display of the host computer 201, and setting is stopped, and if there is enough remainder, the reserved print data are set in the digital copier (S1101 to S1106). As a result, depending on the memory status of the printer side, reserved print is accepted or rejected, and the controllability is enhanced.

(Embodiment 8)

Figure 16:
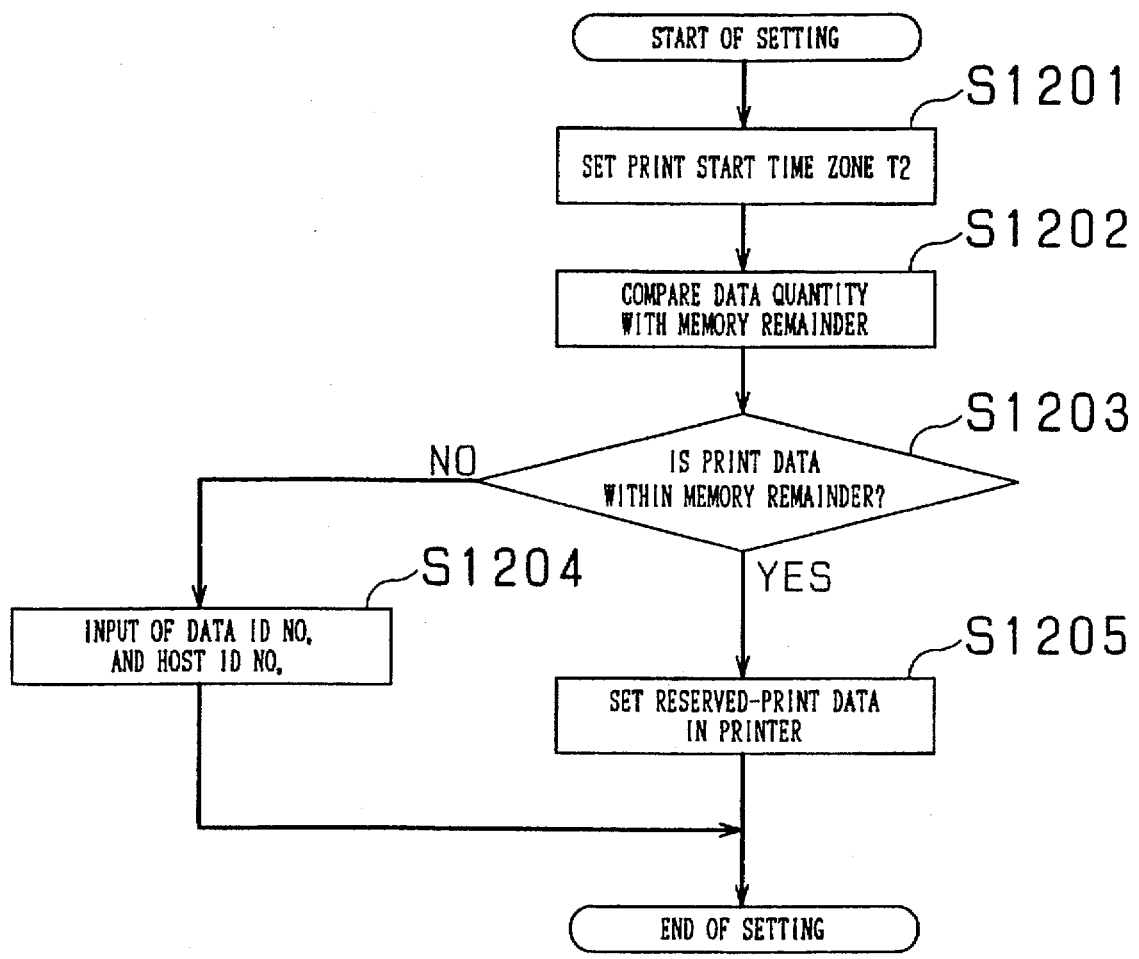
FIG. 16 is a flowchart showing operation of reserved print function in embodiment 8.

A further different embodiment of the invention is described in FIG. 16. FIG. 16 is a flowchart showing the operation of reserved print function in embodiment 8. In embodiment 8, print data are held in the host computer 201, and as the ID code of this print data, for example, the print start time zone T2 and ID code of host computer 201 are stored in the memory 203 of the digital copier 30, and the data are read out from the host computer 201 and printed whenever required.

At step S1201, print start time zone T2 is set. At step S1202, the data quantity of print data in the host computer 201 and the memory remainder of the memory 203 are compared. At step S1203, the data quantity of the print data is judged to be within the memory remainder of the memory 203 or not. If judged to be within, at step S1205, the print data are set in the digital copier 30, and reservation setting action is over.

At step S1203, if the data quantity of the print data is judged not to be within the memory remainder of the memory 203, at step S1204, as the ID code of the print data, for example, the print start time zone T2 and ID code of the host computer 201 are entered, and reservation setting operation is over. The digital copier 30, when the time measured by the clock unit 208 coincides with the print start time zone T2 entered at step S1204, the print data are read out from the host computer 201 according to the ID code entered at step S1204, and print operation is executed.

In the embodiment, only the ID code of the reserved print data (e.g., as print start time zone T2, 9:00 to 9:30 a.m., 2:30 to 2:45 p.m., etc.), and the ID code of the host computer 201 (e.g., see embodiment 4) are stored in the memory 203, while the print data are stored in the memory of the host computer 201 side, and when the measured time of the digital copier 30 as printer and the print start time zone T2 of the ID code of the reserved print data coincide, the print data are received from the memory of the host computer 201 of the stored ID code, and reserved print is processed (S1201 to S1205). As a result, reserved print can be set according to the memory occupation rate at the printer side, and the controllability is enhanced.

(Embodiment 9)

Figure 17:
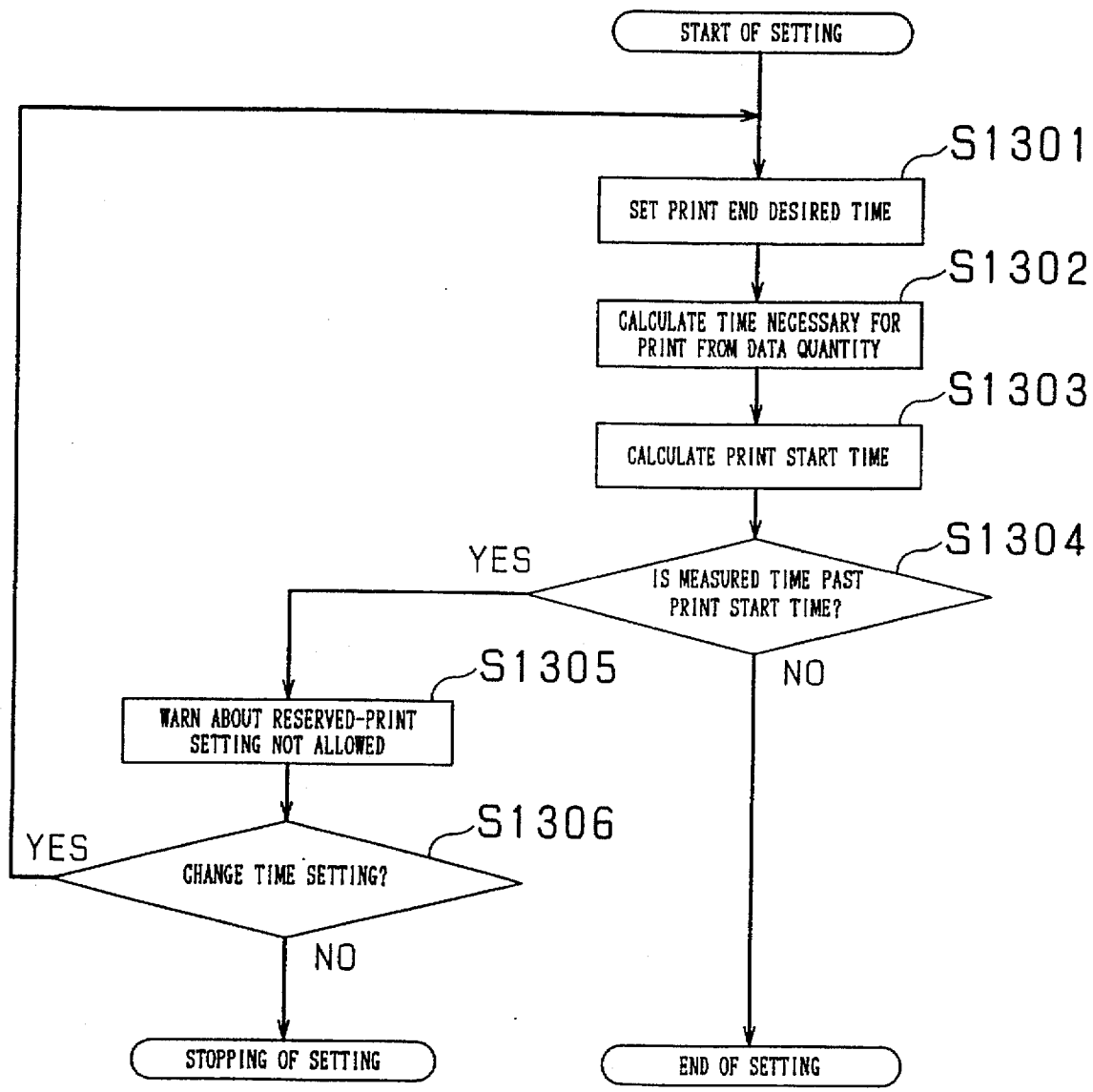
FIG. 17 is a flowchart showing operation of reserved print function in embodiment 9.

Another different embodiment of the invention is described according to FIG. 17. FIG. 17 is a flowchart showing the operation of reserved print function of embodiment 9. In this embodiment 9, by setting the desired print end time, printing of print data is completed by this desired print end time.

At step S1301, desired print end time is set. At step S1302, time required for printing T3 is calculated from the data quantity of print data and printing speed. At step S1303, print start time is calculated from the preset desired print end time and calculated time required for printing T3. At step S1304, it is judged whether the print start time calculated at step S1303 is past the time measured by the clock unit 208 or not. If judged to be past, at step S1305, it is warned that reserved print is not allowed. At step S1306, it is judged whether or not to change the desired print end time. The process returns to step S1301 when changing, and setting action of reserved print is stopped when not changing.

At step S1304, when the print start time calculated at step S1303 judged not to be past the time measured by the clock unit 208, setting action of reserved print is finished.

According to the embodiment, alternatively, when setting reserved print, the desired print end time is set, for example, "finish by 3:00 p.m.," and the time required for printing T3 is calculated from the job quantity of the transferred reserved print data, the print start time is calculated by subtracting the time required for printing T3 from the desired print end time, and reserved print setting is over, and when coinciding with the measured time of the printer, reserved print is processed. If the calculated print start time does not coincide with the measured time (present time) of the printer (if past), it is displayed (warned) that reserved print is not allowed on the display of the host computer 201, and setting is stopped (interrupted) (S1301 to S1306). For example, when set as "finish by 3:00 p.m." as mentioned above, supposing the time required for printing T3 is 10 minutes, the print start time will be 2:50 p.m.

(Embodiment 10)

Figure 18:
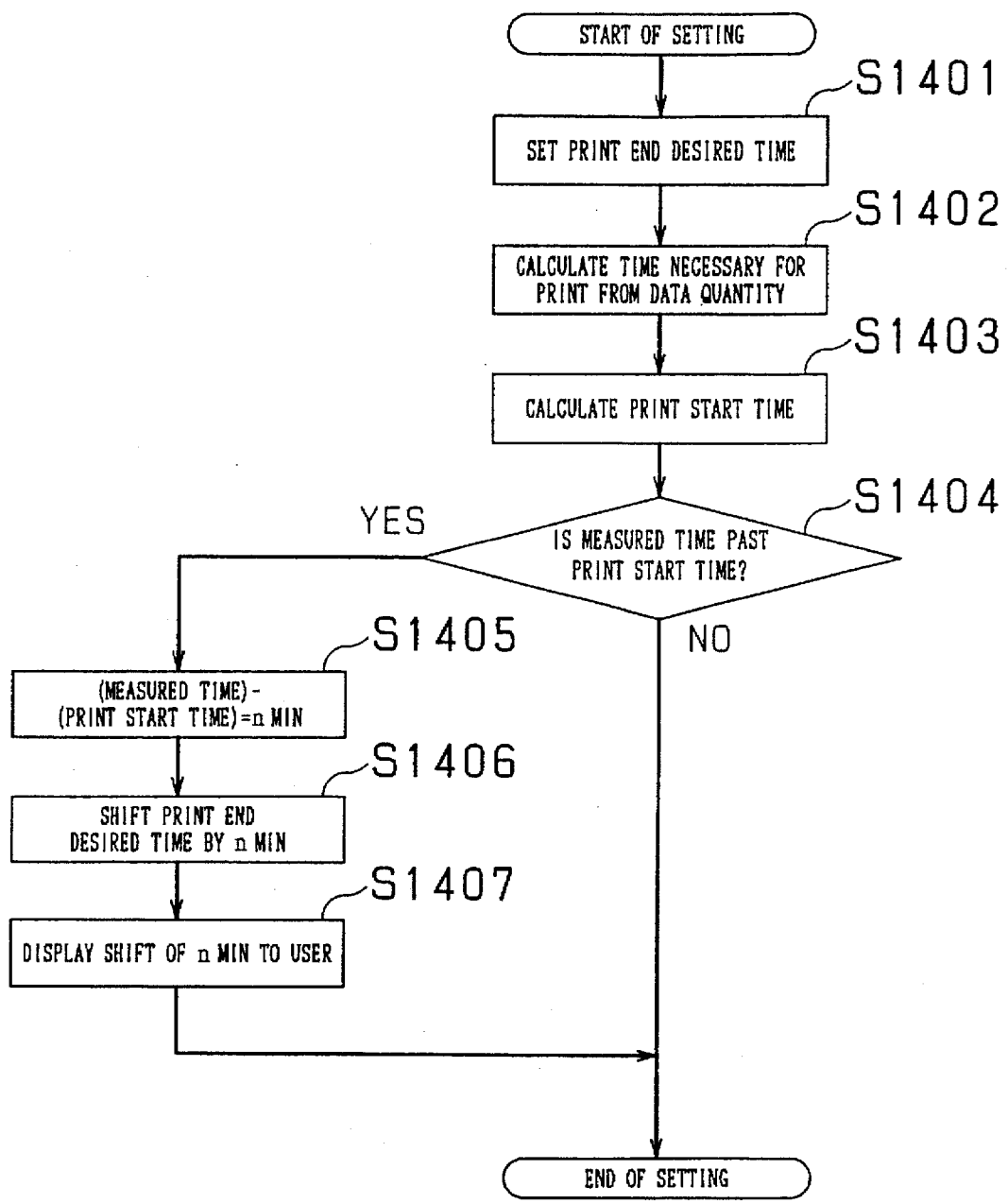
FIG. 18 is a flowchart showing operation of reserved print function in embodiment 10.

A further different embodiment of the invention is described by reference to FIG. 18. FIG. 18 is a flowchart showing the operation of reserved print function of embodiment 10. In embodiment 10, desired print end time is set same as in embodiment 9, and if the calculated print start time is past the time measured by the clock unit 208, the desired print end time is shifted automatically.

At step S1401, desired print end time is set. At step S1402, time required for printing T3 is calculated from the data quantity of print data and the printing speed. At step S1403, print start time is calculated from the preset desired print end time and the calculated time required for printing T3. At step S1404, it is judged whether the print start time calculated at step S1403 is past the time measured by the clock unit 208. At step S1405, if judged to be past, the calculated print start time is subtracted from the time measured by the clock unit 208, and the balance n is calculated. At step S1406, the preset desired print end time is shifted by the balance n calculated at step S1405. At step S1407, it is noticed to the operator that the desired print end time is shifted by n. For example, it is noticed by displaying in the display unit of the operation panel of the digital copier 30.

When the print start time calculated at step S1403 is judged not to be past the time measured by the clock unit 208 at step S1404, or when the operation of step S1407 is over, the setting action of reserved print is finished.

Alternatively, according to the embodiment, if the measured time (the present time) of the printer is past by n minutes from the calculated print start time. the desired print end time is automatically shifted by n minutes, and the change (shifting backward) of the desired print end time is shown on the display of the host computer 201 for obtaining understanding, and setting is over (S1401 to S1407). As a result, depending on the print job quantity, the print time is automatically corrected, so that reserved print may be done at the desired set time as closely as possible.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A printing control apparatus to be used in connection with a printing apparatus comprising:

print information memory means for storing print information to be printed;

clock means for measuring time;

reserved-print allowed time zone setting means for setting a reserved-print allowed time zone possible to start printing;

operation means for calculating the printing time required for printing from the quantity of the print information stored in the print information memory means and printing speed of the printing apparatus;

print time zone setting means for setting the calculated printing time required for printing as a print time zone on a time axis in which the reserved-print allowed time zone is set, corresponding to the print information stored in the print information memory means;

start time judging means for judging whether the print start time of the print time zone is within the reserved-print allowed time zone;

end time judging means for judging whether print end time of the print time zone is within the reserved-print allowed time zone; and control means for printing the print information stored in the print information memory means by the printing apparatus when the time measured by the clock means coincides with the print start time, in the case where the judging results of the start time judging means and end time judging means indicate that the print start time and print end time of the print time zone are both within the reserved-print allowed time zone, and prohibiting printing of the print information when at least one of the print start time and print end time of the print time zone is out of the reserved-print allowed time zone.

2. The printing control apparatus of claim 1, further comprising print forbidden time zone setting means for setting a print forbidden time zone for forbidding printing, wherein the control means prohibits printing of print information when the print time zone is within the print forbidden time zone.

3. The printing control apparatus of claim 2, further comprising warning means for warning that printing is not allowed, wherein when the print time zone is within the print forbidden time zone and printing of print information is prohibited, the control means causes the warning means to warn that printing is not allowed.

4. The printing control apparatus of claim 1, further comprising priority order setting means for setting priority order of printing corresponding to the print information, wherein the control means prints the print information in the printing apparatus according to the priority order set in the priority order setting means when the print time zones calculated and set in plural sets of printing information are overlapped.

5. The printing control apparatus of claim 1, further comprising output means for outputting the print time zone including the print start time and print end time of the print information stored in the print information memory means.

6. The printing control apparatus of claim 1, further comprising comparing means for comparing the quantity of the print information and a memory remainder of the print information memory means, wherein the control means prohibits printing of the print information when the result of comparison by the comparing means shows that the quantity of the printing information is over the memory remainder of the print information memory means.

7. The printing control apparatus of claim 1, further comprising desired print end time setting means for setting desired print end time for finishing printing, and warning means for warning printing is not allowed, wherein the print time zone setting means sets the print time zone so that the desired print end time may coincide with the print end time in the print time zone, and the control means prohibits printing of the print information when the print start time of the print time zone set by the print time zone setting means is past the time measured by the clock means, while the warning means warns printing is not allowed.

8. The printing control apparatus of claim 1, further comprising desired print end time setting means for setting desired print end time for finishing printing, wherein the print time zone setting means sets the print time zone so that the desired print end time may coincide with the print end time in the print time zone, and the control means shifts the print time zone so that the print start time may be later than the time measured by the clock means when the print start time of the print time zone set by the print time zone setting means is past the time measured by the clock means.

* * * * *